United States Patent [19]

Hattori et al.

[11] Patent Number: 4,652,994
[45] Date of Patent: Mar. 24, 1987

[54] SYSTEM FOR TRANSMITTING DATA TO AUXILIARY MEMORY DEVICE

[75] Inventors: Seiichi Hattori, Hachioji; Kunio Kanda, Kunitachi, Japan

[73] Assignee: Fanuc Ltd, Minamitsuru, Japan

[21] Appl. No.: 776,969
[22] PCT Filed: Jan. 23, 1985
[86] PCT No.: PCT/JP85/00025
§ 371 Date: Sep. 13, 1985
§ 102(e) Date: Sep. 13, 1985
[87] PCT Pub. No.: WO85/03372
PCT Pub. Date: Aug. 1, 1985

[30] Foreign Application Priority Data

Jan. 28, 1984 [JP] Japan .................................. 59-12843

[51] Int. Cl.⁴ ............................................ G06F 13/00
[52] U.S. Cl. .................................................. 364/200
[58] Field of Search ......................... 364/200 MS File

[56] References Cited

U.S. PATENT DOCUMENTS 4,532,587 7/1985 Roskell et al. ...................... 364/200

Primary Examiner—Raulfe B. Zache
Attorney, Agent, or Firm—Staas & Halsey

[57] ABSTRACT

A system for exchanging data between a microprocessor (1) and an auxiliary memory device (10) connected to the microprocessor (1). A plurality of data exchange common RAMs (24, 25) are arranged in the auxiliary memory device (10), and the operating states of the common RAMs (24, 25) are stored in memory means (26, 27), respectively. Data exchange is performed through a common RAM (24, 25) which is not being used in accordance with the storage content of said memory means (26, 27), thereby decreasing the waiting time for data transmission/reception.

6 Claims, 4 Drawing Figures

FIG. 3A
FIG. 3B
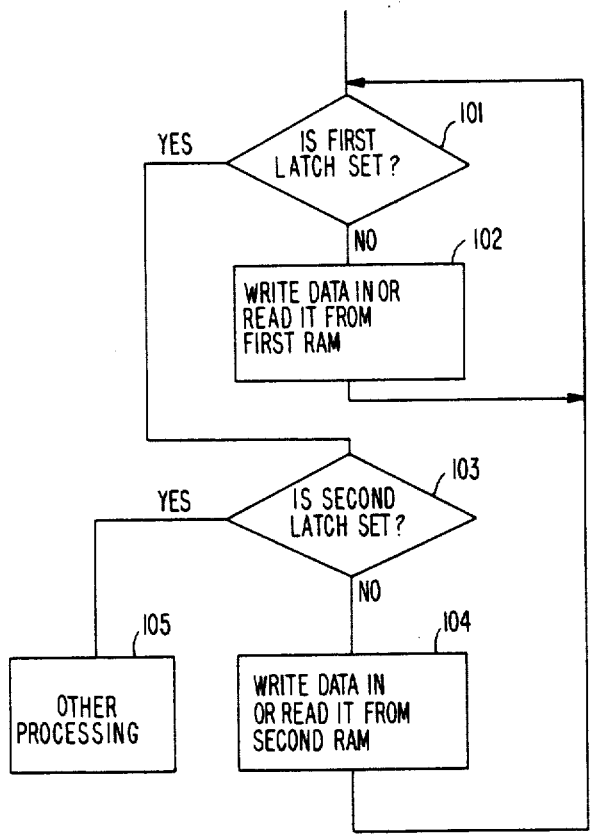
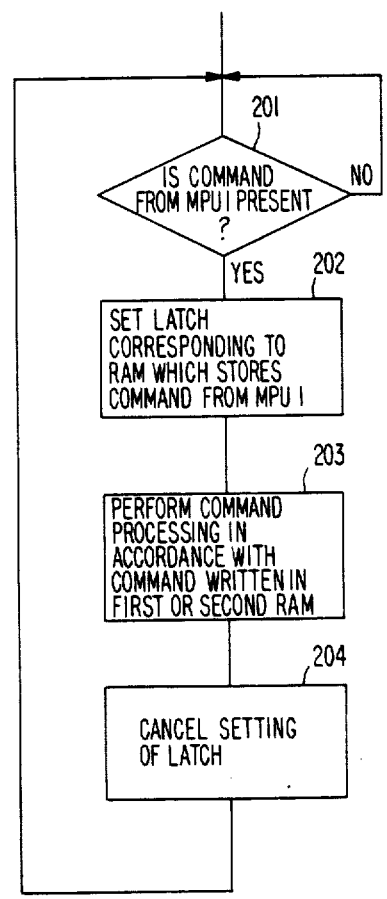

SYSTEM FOR TRANSMITTING DATA TO AUXILIARY MEMORY DEVICE

BACKGROUND OF THE INVENTION

The present invention relates to a system for transmitting data to an auxiliary memory device connected to a microprocessor.

Data transmission between a microprocessor and an external auxiliary memory device is conventionally performed by using a common random access memory (to be referred to as a common RAM hereinafter). Such a conventional system is shown by a block diagram of FIG. 1. Reference numeral 1 denotes a microprocessor (to be referred to as an MPU hereinafter) of a main device; and 2, an auxiliary memory device. The auxiliary memory device 2 has a data transmission/reception common RAM 4, data bus transceivers 5 and 6, and a memory medium 9 such as a magnetic disk. Reference numerals 7 and 8 denote buses, respectively.

With the above arrangement, when data is transmitted or received, (1) the MPU 1 in the main device writes command data in the common RAM 4, (2) the MPU 3 in the auxiliary memory device reads command data from the common RAM 4, (3) the MPU 3 writes an execution result in the common RAM 4, and (4) the MPU 1 reads the execution result from the common RAM 4.

Among operations (1) to (4), operations (1) and (2) or operations (3) and (4) are often simultaneously performed. In this case, when the MPUs 1 and 3 simultaneously access the common RAM 4, one of the MPUs is halted while the other MPU is being operated according to the conventional system. For example, access from the MPU 1 is performed while the operation of the MPU 3 is halted. When the operation of the MPU 1 is completed, the operation of the MPU 3 is started.

When one MPU must read or write access the common RAM 4 at high speed, this MPU must exclusively use the common RAM.

For example, when the MPU 3 in the auxiliary memory device 2 exclusively uses the common RAM 4 for direct memory access transfer, the MPU 1 in the main device must wait for a long period of time when it accesses the common RAM 4. As a result, the MPU 1 cannot perform other operations. In order to allow access of the common RAM 4 by the MPU 1 even during this period, data transfer from the MPU 3 is delayed, resulting in inconvenience.

SUMMARY OF THE INVENTION

It is an object of the present invention to provide a system having a plurality of common RAMs to decrease a wait time and to transmit data to or receive it from an auxiliary memory device at high speed.

It is another object of the present invention to provide a system for transmitting data to or receiving data from an auxiliary memory device, wherein when a main MPU and an auxiliary memory MPU simultaneously access an identical common RAM, one of the main and auxiliary memory MPUs has a priority over the other.

In order to achieve the above objects of the present invention, a plurality of data transmission/reception common RAMs are arranged in the auxiliary memory device, and a memory means is also provided for each common RAM to store an operating state of the corresponding common RAM. When the auxiliary memory device detects that a command is written by an external microprocessor in one of the common RAMs, the memory means corresponding to this common RAM is set, and data representing the operating state of the corresponding common RAM is stored in this memory means. When command processing is completed, the memory means is reset. The external microprocessor employs a system for transmitting data to or receiving data from the auxiliary memory device, so as to supply a command to a common RAM corresponding to a memory means which is not set, upon searching of the memory means (i.e., a common RAM which is not currently used by the auxiliary memory device). According to the present invention, there is also provided a priority order control circuit. A high-speed operation side is selected when the external microprocessor and the auxiliary memory device simultaneously access the identical RAM.

Since a plurality of common RAMs are provided, the main device microprocessor can exchange data with the auxiliary memory device at high speed. At the same time, continuous processing can be performed without interrupting the operation of the auxiliary memory device and the main device. Even if the common RAM is simultaneously accessed by the main microprocessor and the auxiliary memory device microprocessor, the high-speed operation side is selected by the priority order control circuit, thereby achieving high efficiency.

BRIEF DESCRIPTION OF DRAWINGS

FIG. 3A is a flow chart for explaining the operation of the main device of the system shown in FIG. 2; and FIG. 3B is a flow chart for explaining the operation of the auxiliary memory device of the system shown in FIG. 2.

DETAILED DESCRIPTION OF THE PREFERRED EMBODIMENT

The present invention will be described in detail with reference to FIGS. 2, 3A and 3B.

Figure 1:
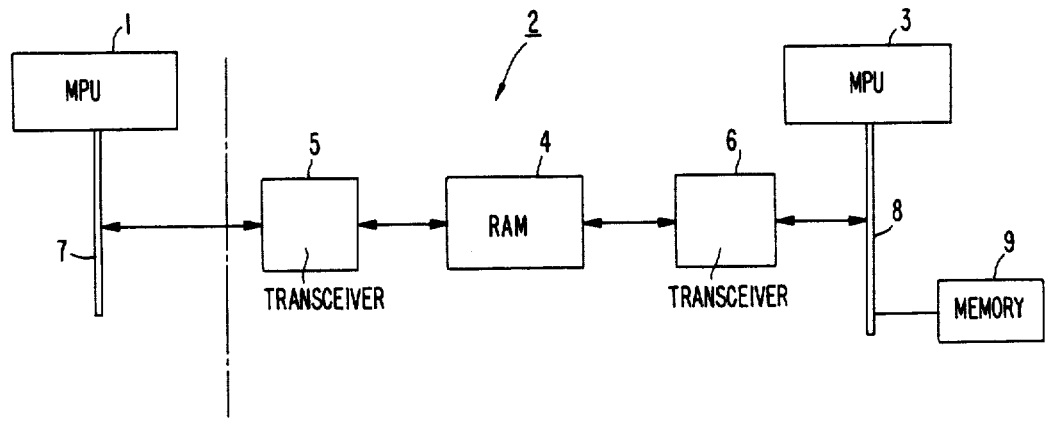
FIG. 1 is a block diagram of a conventional system for exchanging data between the auxiliary memory device and the main device.
Figure 2:
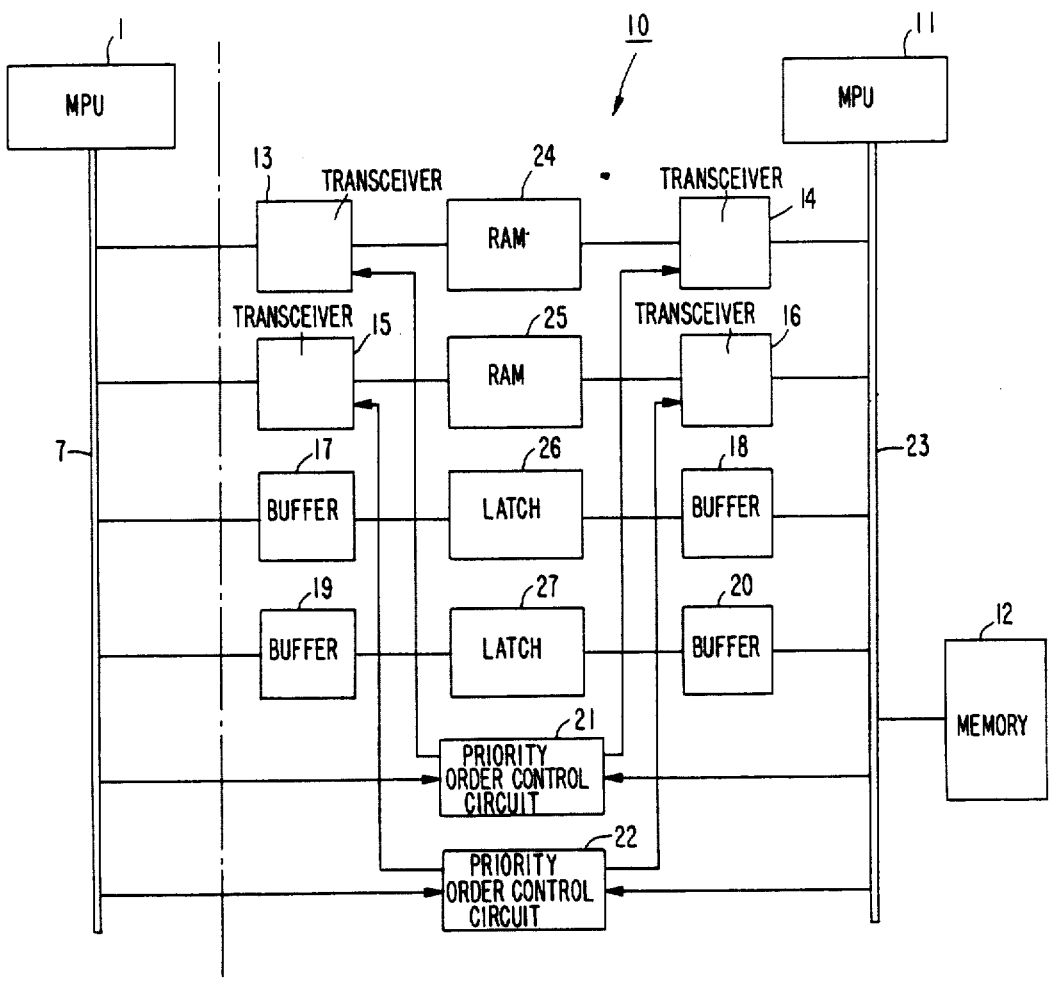
FIG. 2 is a block diagram of a system for exchanging data between a main device and an auxiliary memory device according to an embodiment of the present invention.

FIG. 2 is a block diagram of an embodiment of the present invention. Reference numeral 1 denotes an MPU of a main device used in a control device or the like; and 10, an auxiliary memory device as an embodiment of the present invention, which is connected to the MPU 1 of the main device. Reference numeral 11 denotes a control MPU of the auxiliary memory device 10; and 12, a memory medium, such as a magnetic disk, in the auxiliary memory device 10. Reference numerals 24 and 25 denote first and second common RAMs, respectively; 13 and 14, data bus transceivers; and 26 and 27, memory means for storing data representing that the first or second common RAM 24 or 25 is occupied by the MPU 11. The memory means 26 and 27 are referred to as first and second latches 26 and 27 hereinafter. Reference numerals 17 to 20 denote data bus buffers. Reference numerals 21 and 22 denote priority order control circuits. When the MPUs 1 and 11 simultaneously access the first or second common RAMs, 24 or 25, the priority order control circuits 21 and 22 control priority order. Reference numerals 7 and 23 denote buses.

With this arrangement, the auxiliary memory device 10 performs high-speed operation. A data exchange operation between the main device MPU 1 and the auxiliary memory device 10 will be described with reference to FIGS. 3A and 3B. FIG. 3A shows the operation of the MPU 1 of the main device. When the MPU 1 supplies a command to the external auxiliary memory device 10, e.g., when the MPU 1 generates a command to fetch a file F1, the MPU 1 checks through the data bus buffer 17 whether or not the first latch 26 is set (step 101). In a manner to be described later, since the first latch 26 is held set while the MPU 11 in the auxiliary memory device 10 accesses the first common RAM 24, the MPU 1 determines whether or not the first common RAM 24 is occupied by the MPU 11 in accordance with the state of the first latch 26. If the result of step 101 is NO, i.e., when the first common RAM 24 is not occupied by the MPU 11, the command data is written in the first common RAM 24 (step 102). However, if the MPU 1 determines that the first latch 26 is set, the MPU 1 then determines through the data bus buffer 19 whether or not the second latch 27 is set (step 103). If the result of step 103 is NO, the command is written in the second common RAM 25 (step 104). When the second latch 27 is also set, it indicates that the second common RAM 25 is also being accessed by the MPU 11. In this case, the MPU 1 performs other processing (step 105). The above processing has been described for writing command data from the MPU 1 to the first and second common RAMs 24 and 25. In the read access of the first and second common RAMs 24 and 25, the above operation can also be applied. More specifically, the operating state of the first or second latch 26 or 27 is checked, and the data is fetched from one of the first and second common RAMs 24 and 25 which is available.

The MPU 1 repeats the above operation every time the auxiliary memory device is accessed.

The MPU 11 in the auxiliary memory device 10 performs the sequence shown in FIG. 3B. The MPU 11 checks through the data bus transceivers 14 and 16 whether or not a command is supplied from the MPU 1 to the first or second common RAM 24 or 25 (step 201). When the MPU 11 determines the command data is received by the first or second common RAM 24 or 25, the first or second latch 26 or 27 which corresponds to the first or second common RAM 24 or 25 receiving the command data, is set. For example, when the first common RAM 24 receives the command data, the first latch 26 corresponding to the first common RAM 24 is set through the data bus buffer 18 (step 202). The operation is performed in accordance with the command written in the first or second common RAM 24 or 25 (the first common RAM 24 in this case). The operation result is written in the corresponding common RAM (the common RAM which has received the command; the first common RAM 24 in this case) (step 203). The setting state of the first or second latch 26 or 27 which corresponds to this common RAM is cancelled (step 204). The MPU 11 signals that the setting of the first or second common RAM 24 or 25 is cancelled. The MPU 11 repeatedly performs operations in steps 201 to 204.

In this manner, when the MPU 11 in the auxiliary memory device 10 accesses the first or second common RAM 24 or 25, the first or second latch 26 or 27 corresponding to the first or second common RAM 24 or 25, is set when it occupies the corresponding common RAM. Therefore, the MPU 1 in the main device can use the common RAM which is not occupied. Unlike in the conventional system, waiting time is decreased, and the MPU 11 in the auxiliary memory device 10 can be operated at high speed.

The priority order control circuits 21 and 22 determine access priority order when the MPUs 1 and 11 simultaneously access the first or second common RAMs 24 or 25. In this embodiment, the MPU 11 in the auxiliary memory device 10 has a priority over the MPU 1, since the auxiliary memory device 10 is operated at high speed.

In the above embodiment, two common RAMs are provided. However, three or more common RAMs can be arranged.

What is claimed is:

1. A system for transmitting data to or receiving data from an auxiliary memory device, comprising:
    a microprocessor;
    an auxiliary memory device connected to said microprocessor, said auxiliary memory device including:
        a plurality of data transmitting/receiving common random access memories connected to said microprocessor; and
        memory means, connected to said microprocessor, for storing an operating state of each of said plurality of data transmitting/receiving common random access memories, so that upon detection of writing of a command from said microprocessor in a given one of said plurality of common random access memories, one of said memory means which corresponds to said given common random access memory, is set, after processing of the command is completed, said one memory is reset, and said microprocessor supplies another command to one of said plurality of common random access memories which corresponds to memory means which is not set upon searching of said memory means.

2. A system according to claim 1, wherein one of said microprocessor and said auxiliary memory device is a high-speed operation unit, and wherein said auxiliary memory device further comprises a priority order control circuit, connected to said microprocessor, for selecting the one of said auxiliary memory device and said microprocessor which is the high-speed operation unit, when said auxiliary memory device and said microprocessor simultaneously access an identical one of said plurality of common random access memories.

3. A system for transmitting and receiving data, comprising:
    a microprocessor for generating read and write commands; and
    an auxiliary memory device, connected to said microprocessor, for receiving the read and write commands from said microprocessor, said auxiliary memory device including:
        at least two data transmitting/receiving common random access memories coupled to said microprocessor; and
        at least two memory means respectively corresponding to said at least two transmitting/receiving common random access memories and coupled to said microprocessor, for storing an operating state of the corresponding one of said at least two data transmitting/receiving common random access memories; and control means for setting the corresponding one of said at least two memory means when said microprocessor provides a read or write command to a selected one of said at least two data transmitting-/receiving common random access memories, for resetting said one of said at least two memory means after processing of the read or write command is completed, said microprocessor supplying another read or write command to one of said at least two data transmitting/receiving common random access memories which corresponds to one of said at least two memory means which is not set.

4. A system according to claim 3, wherein one of said microprocessor and said auxiliary memory device is a high-speed operation unit, further comprising at least two priority order control circuits, connected to said control means and said microprocessor, and corresponding to said at least two data transmitting/receiving common random access memories, for selecting the one of said auxiliary memory device and said microprocessor which is the high-speed operation unit, when said auxiliary memory device and said microprocessor simultaneously access the same one of said at least two data transmitting/receiving common random access memories.

5. A system according to claim 4, wherein said auxiliary memory device includes an external memory medium coupled to said control means.

6. A system according to claim 5, wherein said external memory medium comprises a magnetic disk.

* * * * *